United States Patent
Degelau et al.

(10) Patent No.: US 10,862,176 B2
(45) Date of Patent: Dec. 8, 2020

(54) PORTABLE RECHARGEABLE BATTERY PACK WITH A SELECTABLE BATTERY SWITCH AND STATE OF CHARGE DISPLAY FOR CORDLESS POWER TOOLS

(71) Applicant: Florida Power & Light Company, Juno Beach, FL (US)

(72) Inventors: Rick D. Degelau, Ames, IA (US); Robert L. Mason, Ankeny, IA (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 80 days.

(21) Appl. No.: 16/009,895

(22) Filed: Jun. 15, 2018

(65) Prior Publication Data

US 2019/0386497 A1 Dec. 19, 2019

(51) Int. Cl.
*H01M 10/44* (2006.01)
*H02J 7/00* (2006.01)
(Continued)

(52) U.S. Cl.
CPC ............ *H01M 10/441* (2013.01); *B25F 5/02* (2013.01); *H01M 2/0202* (2013.01);
(Continued)

(58) Field of Classification Search
CPC .. H01M 10/441; H01M 10/482; H01M 10/48; H01M 10/46; H01M 10/613;
(Continued)

(56) References Cited

U.S. PATENT DOCUMENTS 5,635,814 A 6/1997 Afzal et al.
6,636,015 B1 * 10/2003 Levine .................. H01M 10/48
320/105
(Continued)

FOREIGN PATENT DOCUMENTS

EP 3304760 4/2018
KR 100722527 5/2017
(Continued)

OTHER PUBLICATIONS

DCB1800M3T1 1800 Watt Portable Power Station and Simultaneous Battery Charger Kit, DeWalt®, dewalt.com, accessed: Jun. 2018. 2018.
(Continued)

*Primary Examiner* — Richard Isla
*Assistant Examiner* — Manuel Hernandez
(74) *Attorney, Agent, or Firm* — Jon Gibbons; Fleit Intellectual Property Law

(57) ABSTRACT

A brief case sized battery pack for powering large power tools for use in portable applications. Large cordless power tools, such as torque guns, are often used to fasten very large nuts on wind turbines. AC power for charging may not be available depending on the location within the wind turbine. The portable rechargeable battery pack has several battery elements, each element able to power the cordless power tool. Using a selectable switch, a user manually selects the battery element to power the cordless power tool. The manually operable switch electrically connects to enable one of the first battery elements to be electrically coupled to the at least one DC output electrical connector while the DC output of a battery charger simultaneously charges all the battery elements. In one example, the DC output connector provides at least four positive DC leads all at different voltages plus ground.

14 Claims, 7 Drawing Sheets

(51) Int. Cl.

| | | |
|---|---|---|
| H02J 7/02 | (2016.01) | |
| H01M 2/02 | (2006.01) | |
| H01M 2/20 | (2006.01) | |
| H01M 10/613 | (2014.01) | |
| H01M 10/6235 | (2014.01) | |
| H01M 10/6563 | (2014.01) | |
| B25F 5/02 | (2006.01) | |
| H01M 10/48 | (2006.01) | |
| H01M 2/10 | (2006.01) | |
| H01M 10/46 | (2006.01) | |
| B25B 21/00 | (2006.01) | |

(52) U.S. Cl.
CPC ......... *H01M 2/1077* (2013.01); *H01M 2/204* (2013.01); *H01M 10/46* (2013.01); *H01M 10/48* (2013.01); *H01M 10/482* (2013.01); *H01M 10/613* (2015.04); *H01M 10/6235* (2015.04); *H01M 10/6563* (2015.04); *H02J 7/0013* (2013.01); *H02J 7/0021* (2013.01); *H02J 7/0045* (2013.01); *H02J 7/0047* (2013.01); *H02J 7/0068* (2013.01); *H02J 7/027* (2013.01); *B25B 21/00* (2013.01); *H01M 2220/30* (2013.01)

(58) Field of Classification Search
CPC ......... H01M 10/6235; H01M 10/6563; H01M 2/1077; H01M 2/0202; H01M 2/204; H01M 2220/30; H02J 7/0068; H02J 7/047; H02J 7/0013; H02J 7/0021; H02J 7/0045; H02J 7/027; B25F 5/02; B25B 21/00
USPC .................................................. 320/113, 126
See application file for complete search history.

(56) References Cited

U.S. PATENT DOCUMENTS

| | | | |
|---|---|---|---|
| 6,950,030 B2 | 9/2005 | Kovarik et al. | |
| 7,835,534 B2* | 11/2010 | Cole, Jr. | A45C 15/00 |
| | | | 219/717 |
| 8,604,752 B2* | 12/2013 | Cole, Jr. | H01M 2/1022 |
| | | | 320/114 |
| 9,153,978 B2* | 10/2015 | Reade | H05K 5/023 |
| 9,166,422 B2* | 10/2015 | Brotto | H02J 7/0042 |
| 9,385,351 B2 | 7/2016 | Workman et al. | |
| 9,399,263 B2 | 7/2016 | Bashore et al. | |
| 9,435,563 B2 | 9/2016 | Einhorn | |
| 9,800,074 B2 | 10/2017 | Adames | |
| 10,389,139 B2* | 8/2019 | Velderman | B25F 5/00 |
| 2002/0149345 A1* | 10/2002 | Takano | H02J 7/0068 |
| | | | 320/137 |
| 2005/0226020 A1* | 10/2005 | Asbery | H02J 7/0068 |
| | | | 363/144 |
| 2005/0280393 A1* | 12/2005 | Feldmann | B25F 5/00 |
| | | | 320/114 |
| 2007/0273325 A1* | 11/2007 | Krieger | H01M 2/1027 |
| | | | 320/106 |
| 2008/0111426 A1* | 5/2008 | Elder | H01M 10/4207 |
| | | | 307/66 |
| 2008/0226476 A1 | 9/2008 | Lau | |
| 2011/0050162 A1 | 3/2011 | FallHowe | |
| 2011/0064981 A1* | 3/2011 | Scheucher | H01M 2/1077 |
| | | | 429/99 |
| 2011/0273181 A1 | 11/2011 | Park et al. | |
| 2011/0279090 A1* | 11/2011 | Bauer | H01R 31/06 |
| | | | 320/137 |
| 2012/0249049 A1 | 10/2012 | Hixson et al. | |
| 2013/0043826 A1 | 2/2013 | Workman et al. | |
| 2013/0320919 A1* | 12/2013 | Adames | H02J 7/007 |
| | | | 320/107 |
| 2014/0098525 A1* | 4/2014 | Bennett | H02J 7/0052 |
| | | | 362/183 |
| 2014/0370743 A1* | 12/2014 | Maesnor | H02J 7/0042 |
| | | | 439/504 |
| 2015/0022001 A1* | 1/2015 | Goei | H02J 7/0068 |
| | | | 307/65 |
| 2015/0091392 A1* | 4/2015 | Hwang | H02J 7/0045 |
| | | | 307/150 |
| 2015/0171632 A1* | 6/2015 | Fry | H02J 7/0004 |
| | | | 307/22 |
| 2015/0236538 A1 | 8/2015 | Cai et al. | |
| 2015/0283694 A1 | 10/2015 | Goto et al. | |
| 2015/0367733 A1* | 12/2015 | Peel | B60K 35/00 |
| | | | 320/109 |
| 2016/0006283 A1 | 1/2016 | Liu | |
| 2016/0099575 A1* | 4/2016 | Velderman | H02J 7/0065 |
| | | | 307/72 |
| 2016/0099590 A1* | 4/2016 | Velderman | H02J 7/0045 |
| | | | 320/113 |
| 2016/0332530 A1 | 11/2016 | Roeder et al. | |
| 2017/0069884 A1* | 3/2017 | Beddow | B25F 5/00 |
| 2017/0366017 A1* | 12/2017 | Clay | H02J 9/00 |
| 2018/0006470 A1* | 1/2018 | Stacey | F21L 4/085 |
| 2018/0212445 A1* | 7/2018 | Pitts | H02J 7/022 |
| 2018/0354375 A1* | 12/2018 | Dao | B60L 58/14 |
| 2019/0103805 A1* | 4/2019 | Zhu | H02J 7/0072 |
| 2019/0296290 A1* | 9/2019 | Hansen | H01M 2/1077 |
| 2020/0295575 A1* | 9/2020 | Nook | H02J 9/00 |

FOREIGN PATENT DOCUMENTS

| | | |
|---|---|---|
| WO | WO98039831 | 9/1998 |
| WO | WO2011151110 | 12/2011 |
| WO | WO2014033467 | 3/2014 |
| WO | WO2018007111 | 1/2018 |

OTHER PUBLICATIONS

Xantrex 802-1500 XPower PowerPack 1500 Backup Power; Operates 120 Vac or 12 Vdc products anywhere; Sealed, non-spillable 51 amp-hour AGM battery; High power 12 Vdc connector, Amazon, amazon.com, Item model No. 15599, Dec. 17, 2008. 2017.

New Bosch Mobile Battery Bank Powers Your Corded Tools & Equipment, Tool GuyD, toolguyd.com, Sep. 21, 2015. 2015.

* cited by examiner

PORTABLE RECHARGEABLE BATTERY PACK WITH A SELECTABLE BATTERY SWITCH AND STATE OF CHARGE DISPLAY FOR CORDLESS POWER TOOLS

FIELD OF THE DISCLOSURE

The present disclosure generally relates to cordless power tools, and more particularly to portable rechargeable battery packs to be used with cordless power tools.

BACKGROUND

Recent technology improvements have allowed cordless power tools to become lighter and more powerful. The main issue is short battery life. To counter this, the manufacturers supply multiple batteries and a charger. This helps but the batteries cannot be charged faster than the batteries are depleted during use. Work often stops while waiting for batteries to recharge.

SUMMARY OF THE INVENTION

A brief case sized battery pack for powering large power tools for use in portable applications. Large cordless power tools, such as torque guns, are often used to fasten very large nuts on wind turbines. AC power for charging may not be available depending on the location within the wind turbine. The portable rechargeable battery pack has several battery elements, each element able to power the cordless power tool. Using a selectable switch, a user manually selects the battery element to power the cordless power tool. The manually operable switch electrically connects to enable one of the first battery elements to be electrically coupled to the at least one DC output electrical connector while the DC output of a battery charger simultaneously charges all the battery elements. In one example, the DC output connector provides at least four positive DC leads all at different voltages plus ground.

The brief case sized multi-element battery pack is adapted for use with wind turbines. The multi-element battery pack simultaneously charges and discharges. All of the electrical components are housed in a protective case. Each of the battery elements may be discharges when charging power is not available. The discharging and charging is done without remove or replacing any of the battery elements The peak discharging current is greater than the average charging current.

The multi-element battery pack in one example provides at least four different voltages and ground. A manually operated switch that electrically couples one of the two battery elements to the at least one DC external connector is used. At least one cordless power tool is detachably coupled to the at least one DC external connector on the multi-element battery back. A battery pack adapter is used in lieu of a battery with the cordless power tool.

More specifically, the multi-element battery pack is a rechargeable power pack comprising: a protective case with a first housing portion, and a second housing portion, being hinged together to provide housing assembly and held in a closed position with one or more fasteners. The following components are disposed inside the protective case i) at least a first battery element and a second battery element; ii) an AC input electrical connector for electrically connecting to an external electric AC power source; iii) at least one DC output electrical connector for electrically connecting to a cordless power tool; iv) at least one battery charger with an AC input electrically coupled to the AC input electrical connector and a DC output; and v) at least one manually operable switch electrically connected to enable one of the first battery element and the second battery element to be electrically coupled to the at least one DC output electrical connector while the DC output of the at least one battery charger simultaneously charges both of the first battery element and the second battery element. The DC output electrical connector, in one example includes at least four positive DC leads all at different voltages.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples to show the utility of the transporter. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

The present invention is a portable rechargeable battery power pack for use with cordless power tools. The portable battery power pack is designed to have a minimum four hour life cycle for large cordless power tools. This would allow continuous use of the tool for four hours without the restraint of using an AC power outlet.

More specifically, the present invention is brief case sized battery pack for powering large power tools for use in portable applications. Large cordless power tools, such as torque guns, are often used to fasten very large nuts on wind turbines. AC power for charging may not be available depending on the location within the wind turbine. The portable rechargeable battery pack has several battery elements, each element able to power the cordless power tool. Using a selectable switch, a user manually selects the battery element to power the cordless power tool.

The cordless power tool draws an intermittent high load current from the selected battery element. The present invention provides the ability to simultaneously charge all battery elements, even the battery element being used to power the cordless power tool. This charging results in a lower continuous charging current. This battery power pack with multiple individually selectable battery elements and the built-in charger are all packaged in one portable protective case.

Major External Components

Figure 1:
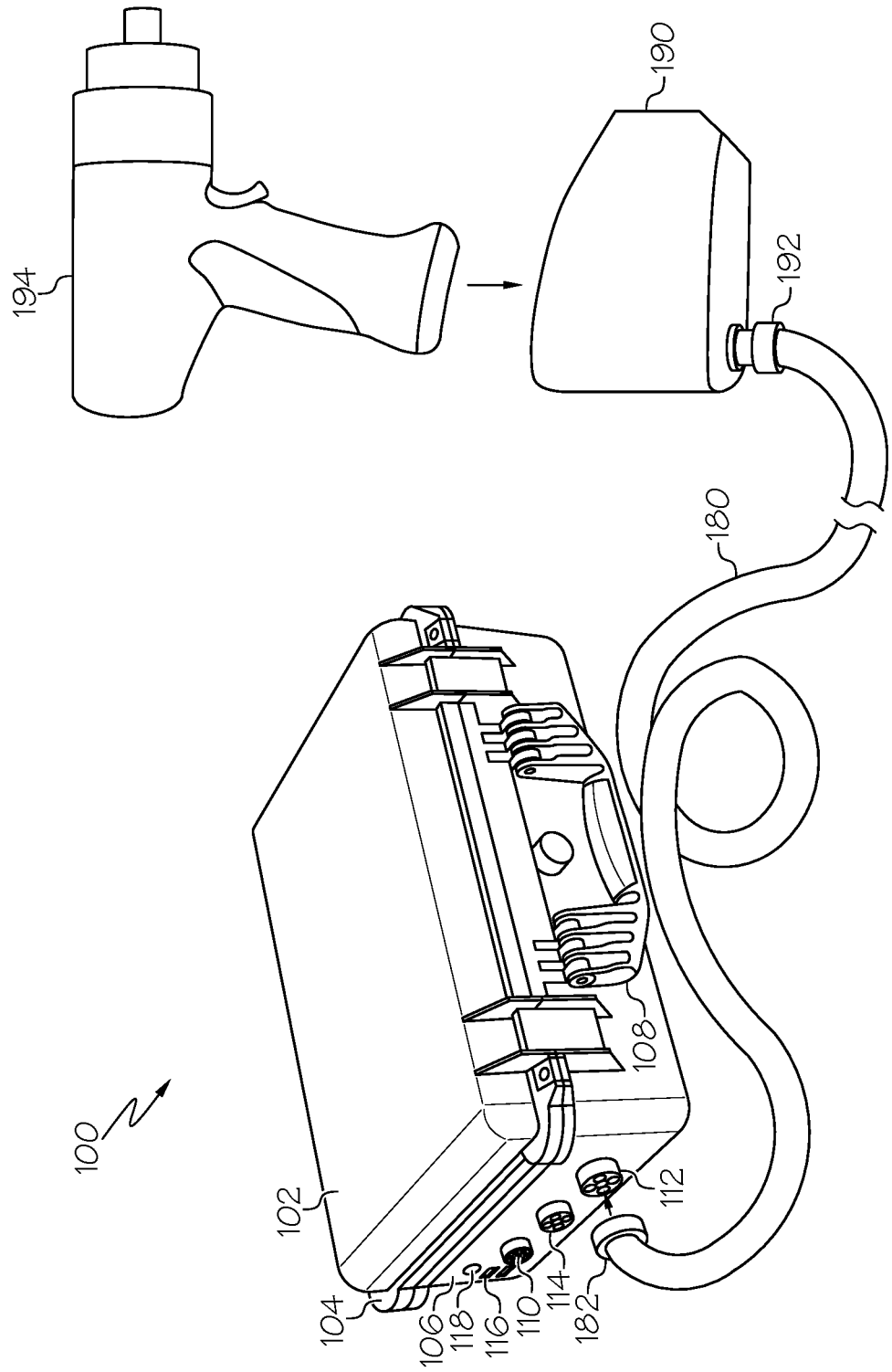
FIG. 1 is an diagram of the major external components of the portable rechargeable power pack in accordance with the present invention.

Turning now to FIG. 1, shown are the major external components of the portable rechargeable power pack 100 used with the present invention. A protective case 102, such as a 14"×11"×6" Pelican® case or Member's Mark® 20" protective safety box, is shown. The protective case 102 includes a first housing portion 104 and a second housing portion 106 which are hinged together with a hinge 202 shown in FIG. 2. The first housing portion 104 and the second housing portion 106 are held in a closed position with one more fasteners 250. A handle 108 attached to the protective case 102 is also shown.

The second portion 106 of the protective case 102 includes several openings formed to accommodate external connectors and a fan. One opening shown is at least one AC input electrical connector 110. One example is an Amphenol Bendix® circular plug connector with at least three pins for AC power and ground. Another example is a model CNCCU356 connector available from PEI-Genesis. The purpose of the AC input electrical connector 110 is electrically couple with a detachable cable (not show) for charging the battery elements inside the portable rechargeable power pack 100. The detachable cable is a multi-conductor electrical cable with a first end and a second end. The first end of the detachable cable includes at an electrical connector with sockets to mechanically and electrically mate with the plugs of the AC input connector 110. The second end of the detachable cable includes an electrical outlet plug to plug into an AC external electric power source, such as, an electric outlet.

Another opening shown is at least one DC output electrical connector 112. One example is an Amphenol Bendix® circular plug connector with at least five sockets that provide four distinct DC voltage levels and ground. Another example is a model CA3102F16S-1SB available from PEI-Genesis. The purpose of the DC out electrical connector 112 is to couple with a detachable flexible cable 180 with connector 182 to provide power to a cordless power tool 194, in lieu of the typical battery pack (not shown) mounted on the cordless power tool 194. The detachable flexible cable 180 in one example is a ten foot multi-conductor cable, such as a shields 18/8 conductor cable, available from Pacer Group. In place of the typical battery pack is a battery pack adapter 190. The battery pack adapter 190 is mechanically formed to couple to the cordless power tool in place of the typical battery pack. Also the battery pack adapter 190 includes electrical contacts to provide a plurality of different positive DC voltage levels and ground required by the cordless tool 194 to operate. The battery pack adapter 190 includes a rotatable coupling 192 to the cable 180. This rotatable coupling 192 allows the cordless power tool 194 to operate in any position without twisting the detachable cable 180. In one example the four DC voltage levels are 4 volts DC, 6 volts DC, 8 volts DC, and 12 volts DC. It is important that other voltages and additional voltages on the DC out electrical connector 112 is contemplated for use with other cordless power tools in accordance with the present invention. In one example another or second DC output electrical connector 114 is shown. The second DC output electrical connector 114 coupled in a parallel electrical configuration with the DC output electrical connector 112 for electrically connecting with another a cordless power tool.

The use of multiple voltages by the cordless power tool all various features to be managed. More specifically, power management includes overload protection, temperature management, individual cell or pouch voltage monitoring, discharge protection and a battery fuel gauge or cell charge percent.

Figure 6:
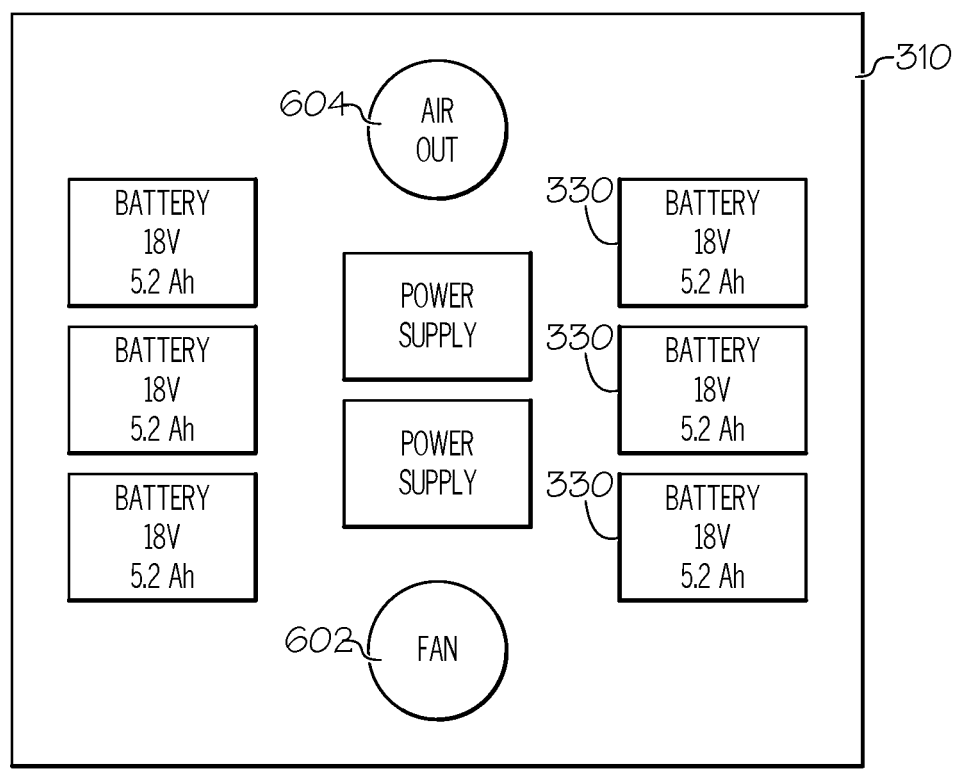
FIG. 6 is a diagram with a fan used to provide cooling during charging of the selectable battery elements of FIG. 3.

Other openings in the second portion 106 of the protective case 102 include an electric fan 602 and one or more vents 604 as shown in FIG. 6. The electric fan 602 is used to dissipate heat from inside the protective case 102 when the external electric power is used to charge the battery elements. The electric fan 602 in one example is an AC fan. In another example the electric fan 602 is a DC fan, such as a 5VD box fan available from Marlin P Jones & Assoc. The fan 602 is only powered or on when the AC to DC power supply (discussed below) is energized with external AC power.

User Controls and Display

Figure 2:
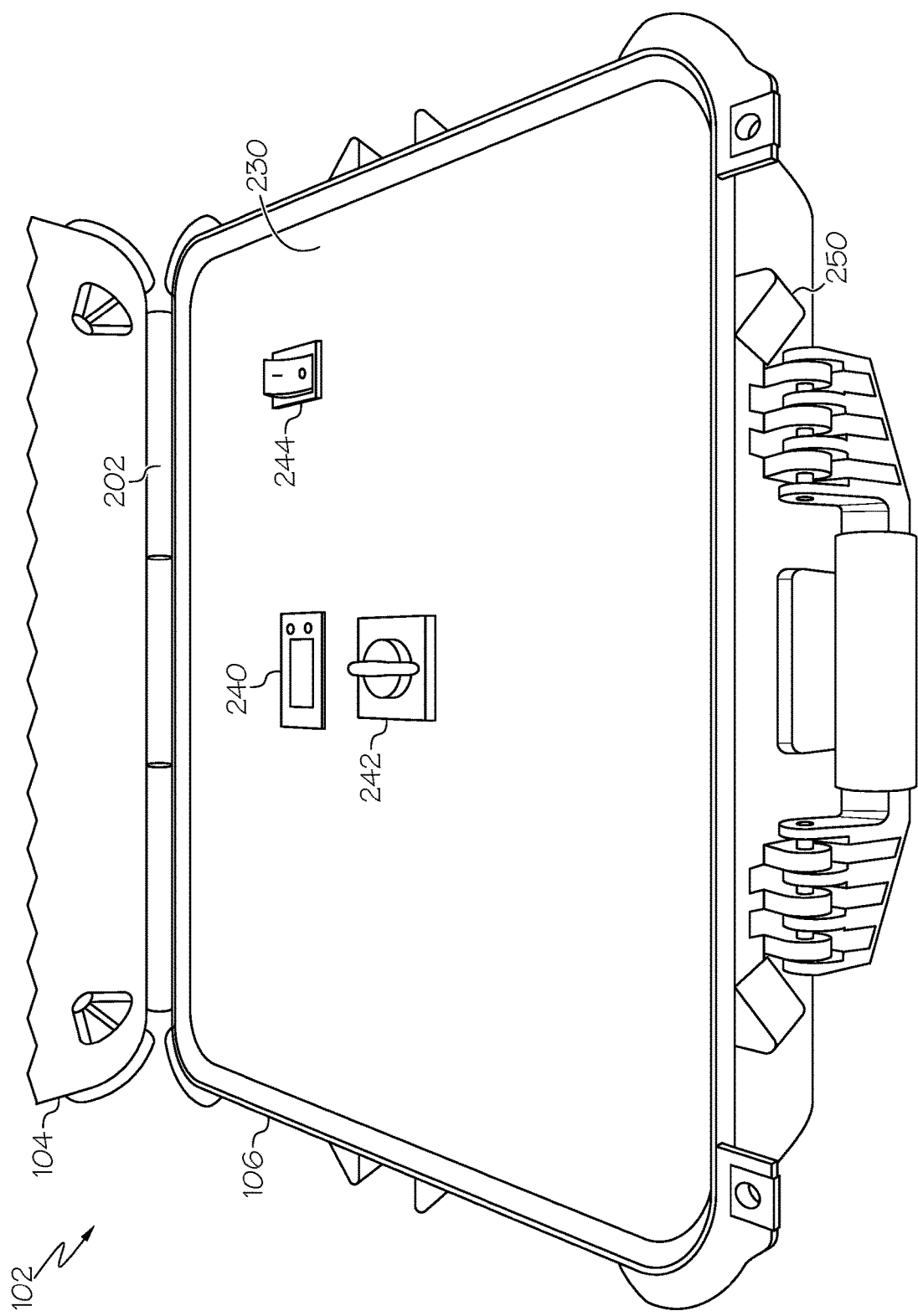
FIG. 2 is a diagram that illustrates the protective case of FIG. 1 in an open position.

FIG. 2 illustrates further the protective case 102 in an open position with a first housing portion 104 and a second housing portion 106 which are hinged together with a hinge 202 as shown. Also shown is a display 240. One example of a display is a model LCD 10-100V available from Amazon. The display 240 (as shown as display 540 in FIG. 5) indicates the charge on one of the battery elements (further described below) as selected by a battery selector switch 242. In addition to electrically connecting the display 240 to one of the battery elements, the battery selector switch 242 electrically couples the selected battery element to the DC output electrical connector 112. Once example of the battery selector switch 242 is a mechanical eight pole LW6-8/F432 available from Ali Express. Another example is a solid state switch or solid state relays available from Thomas Net A user manually switches a tool to a desired battery element. The selected battery element for cordless power tools has an intermittent high load current while other battery elements are being simultaneously charged have a lower continuous charging current.

A power switch 244 is used to turn on or off the charging when the portable battery pack 100 is connected to external AC electric power source. More specifically, the power switch 244 controls the external AC power on the AC input electrical connector 110 to the AC to DC power supply discussed further below. Each of the display 240, the switch 242, and the power switch 244 is mounted on a corrugated plastic panel as shown.

If needed, the rechargeable battery pack 100 may be plugged into an outlet where a "charge/float" circuit is incorporated to provide a float voltage when a load is applied, i.e. the cordless power tool, which then charges the pack when no load is applied.

Major Internal Electrical Components

Figure 3:
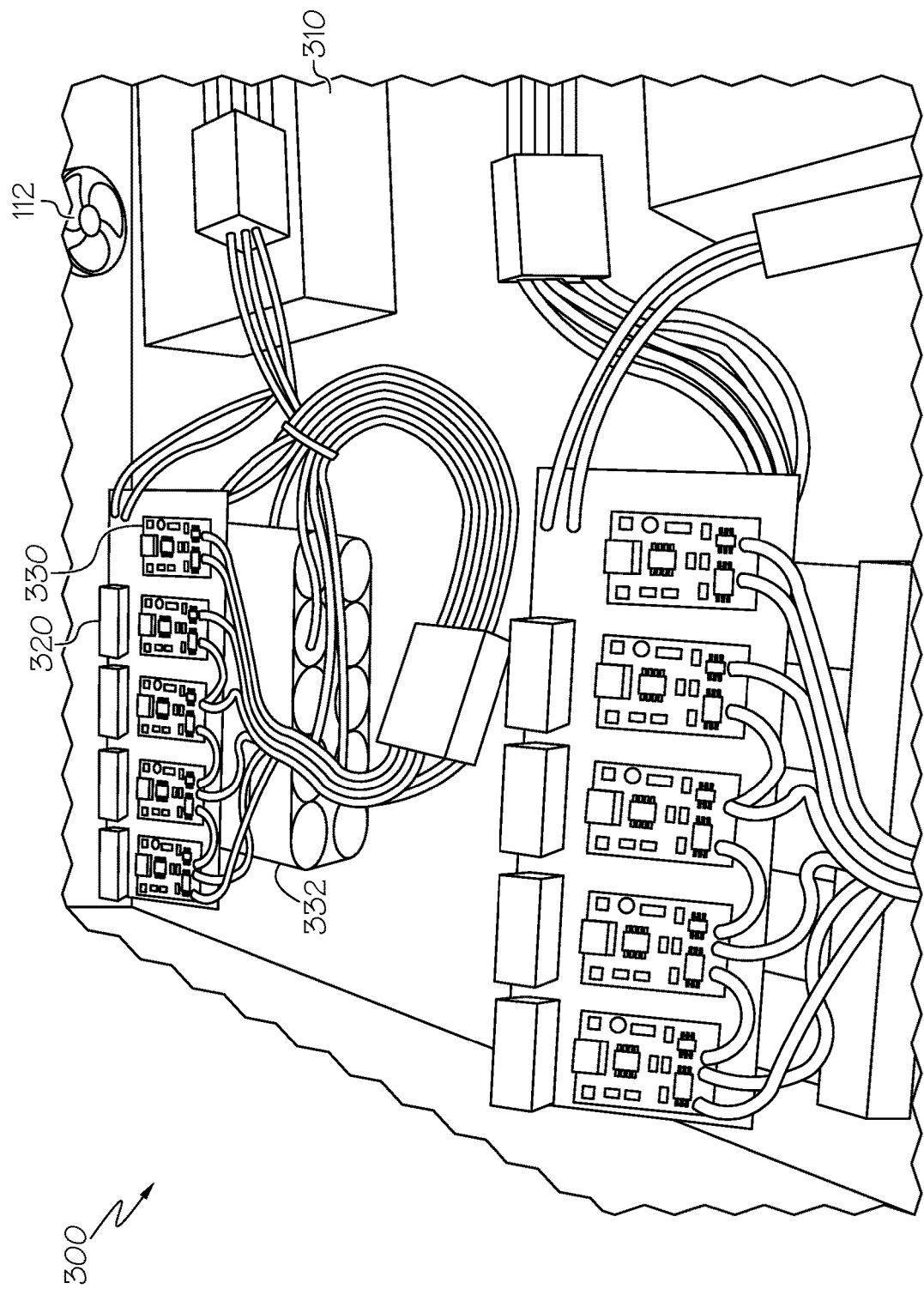
FIG. 3 is a diagram that illustrates the major internal electrical components housed inside the protective case of FIG. 1 and FIG. 2.

Turning now to FIG. 3, shown are the major internal electrical components 300 housed inside the second portion 106 of the protective case 102. An AC to DC power supply 310 for each group 330 of battery pouches 332 is shown. In one example the AC to DC power supply is a Hengfuan 5V, 5A 25W power supply available from Amazon. Each of the AC to DC power supplies 310 are electrically coupled through power switch 244 is to turn on all of the AC to DC power supplies 310 when the AC input electrical connector 110 is connected to external power source.

Each of the power supplies 310 are electrically connected to one or more charger cards 320. Each of the charger cards 320 controls the charging of the individual battery packs 330. Each of the individual battery packs 330 are grouped into two or more battery elements (440 and 450 shown in FIG. 4) which are selectable by the battery selector switch 242. One example of a charger card 320 is a McIgIcM model TP4056 battery charger module which is available from Amazon. Each battery pack 330 is constructed from a plurality of lithium battery pouches 332 held by battery holders. One example of a battery pouch is UR1865ONSX available from IMR Batteries and battery holder (not shown), such as, X0019EPZI9 available from Ali Express.

The battery pouches 332 are placed in series to provide the desired power duration out to the DC output electrical connector 112. Although lithium-ion (Li-ion) battery pouches are used in this one example, other types of rechargeable battery technologies can be used as well including lead-acid, nickel-cadmium (NiCd), nickel-metal hydride (NiMH), and lithium-ion polymer (Li-ion polymer).

Figure 4:
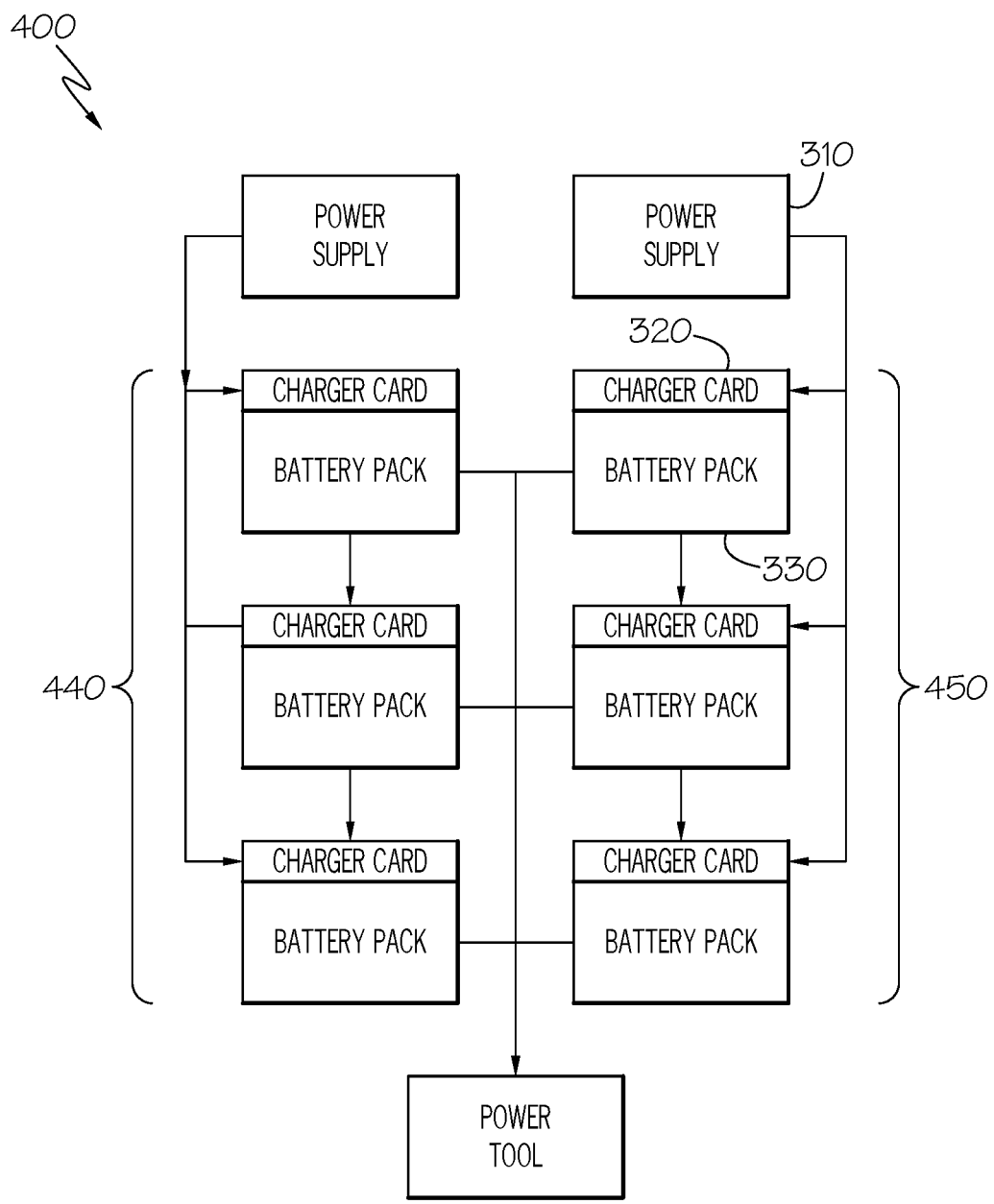
FIG. 4 is a block diagram of the selectable battery elements of FIG. 3.

Sets of one or more battery packs 330 form the selectable battery elements. In this example two selectable battery elements 440 and 450 as shown in FIG. 4. It is important to note that more than two selectable battery elements are contemplated in order to provide at least eight hours of large cordless power tool use. Each of the battery packs 330, the battery pouches 332, the charger cards 320 and even the power supplies 330 can be serviced individually and swapped out through use of 2, 4, and 8 pin electrical plug-socket kits.

It is important to note that through the use of other electrical components, such as, DC/DC Converters, that many other DC voltages can be created. These DC voltages can be used to drive other external accessories detachably connected to external outlets/receptacles disposed in the protective case 102. Examples of other external outlets/receptacles are USB 5V connectors for providing charging through a USB cable. Examples are Blue Sea Systems USB available from Amazon and 12V Cigarette lighter outlet, such as BANDC lighter socket power outlet socket receptacle from Amazon.

In another example, the selector switch 242A and 242B is electrically configured so that when one of the plurality of battery elements 440 and 450 is selected, the unselected battery element is used to power the accessory receptacles/outlets, such as USB outlets 116 and cigarette lighter outlet 118. The inventors have found that even though the unselected battery element does not have enough charge to power the cordless power tool, the partially depleted battery element is still able to provide power to many external accessories, such as cellphones, smartphones, laptops, LED lights, and other 5V and 12V accessories. With this in mind the unselected battery element is electrically connected to the accessory outlets while only the selected battery element is connected to the DC output electrical connector 112.

Figure 5:
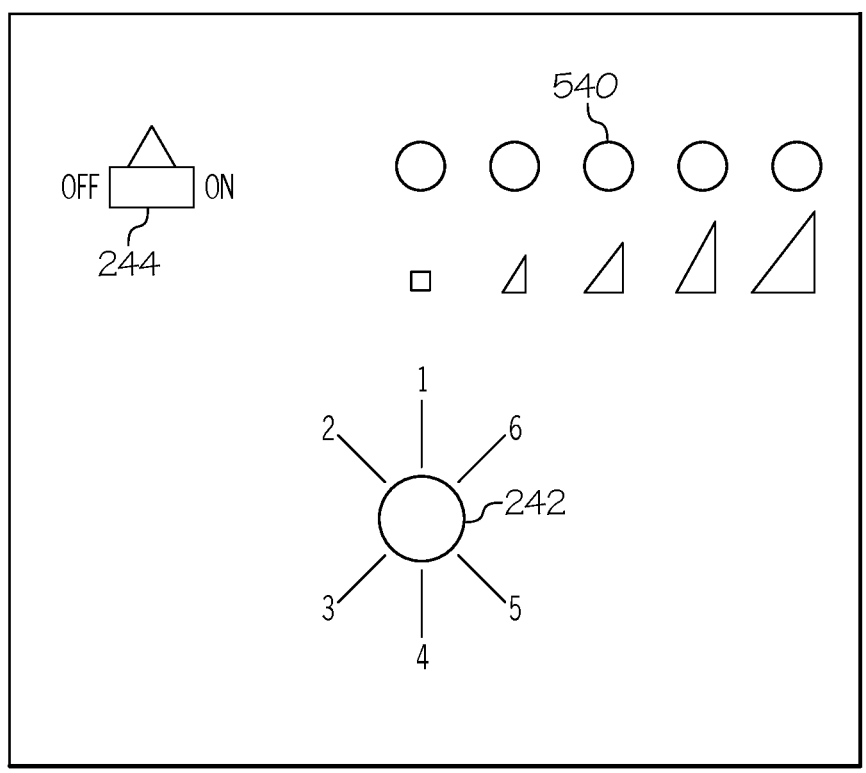
FIG. 5 is another example of the user controls of FIG. 2.
Figure 7:
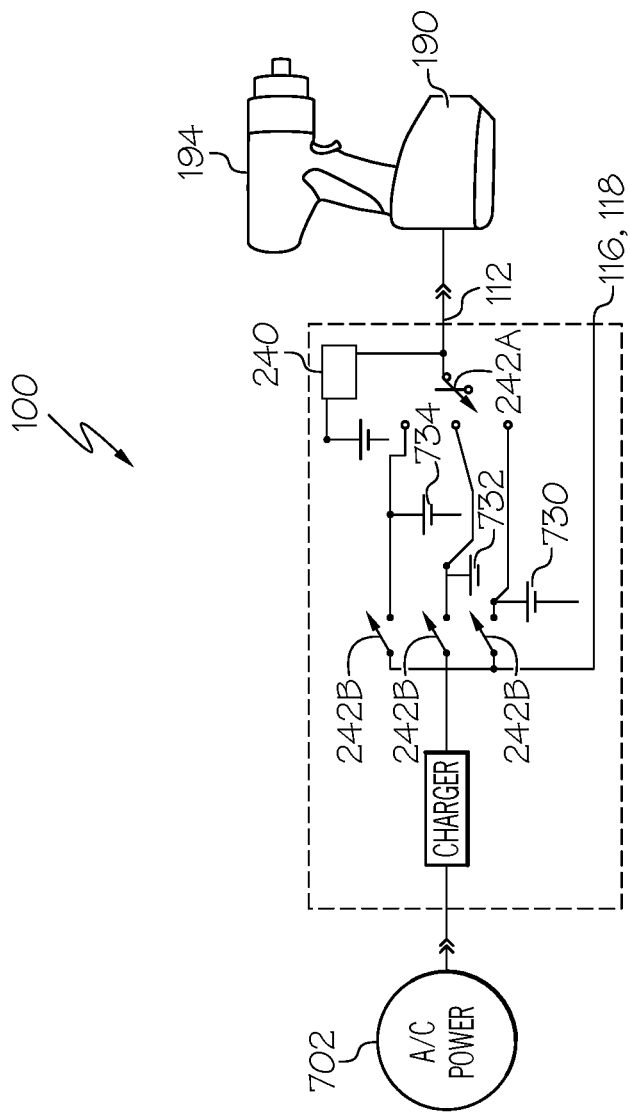
FIG. 7 is an electrical schematic of the circuit of the selector switch.

Turning now to FIG. 7, shown is an electrical schematic of the circuit of the selector switch of FIG. 2 and FIG. 5. The portable rechargeable power pack 100 is connected to external AC power through AC input connector 110. A charger, such as AC/DC power supply 310 is electrically coupled to selector switch 242. The selector switch 242 is a multi-position multiple pole switch. Here are shown three battery elements 730, 732, and 734 which can be selected to provide power to the cordless power tool 194 through the power pack adapter 190 as shown.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A rechargeable power pack comprising:
a protective carrying case with a first housing portion defining a lid, and a second housing portion defining a base, with a closed lid position, an open lid position, being hinged together to provide housing assembly and held in the closed lid position with one or more fasteners, with each of the following components disposed inside the protective carrying case
at least a first battery element and a second battery element disposed in the base;
an AC input electrical connector for electrically connecting to an external electric AC power source;
at least one DC output electrical connector for electrically connecting to a cordless power tool;
at least one battery charger, disposed in the base, with an input electrically coupled to the AC input electrical connector and a DC output;
a panel disposed over the first battery element, the second battery element, and the at least one battery charger in the base;
at least one manually operable multipole switch electrically connected to enable one of the first battery element and the second battery element to be electrically coupled to the at least one DC output electrical connector while the DC output of the at least one battery charger simultaneously charges both of the first battery element and the second battery element; and
a display, which is selectively electrically coupled, through the at least one manually operated multipole switch, to each of the first battery element and the second battery element to indicate an individual charge state thereof, the display and the at least one manually operated multipole switch mounted on the panel.

2. The rechargeable power pack of claim 1, wherein the at least one manually operated multipole switch is a multiple position switch in which each position of the least one manually operated multipole switch electrically couples one of the first battery element and the second battery element to the DC output electrical connector.

3. The rechargeable power pack of claim 1, wherein a DC output electrical connector for electrically connecting to the cordless power tool includes a ground connector and at least four connectors each at different voltages.

4. The rechargeable power pack of claim 3, wherein the different voltages are 4 volts DC, 6 volts DC, 8 volts DC, and 12 volts DC.

5. The rechargeable power pack of claim 1, wherein the DC output electrical connector is an Amphenol Bendix circular plug connector is a plug with a plurality of pins.

6. The rechargeable power pack of claim 5, wherein the AC input electrical connector is an Amphenol Bendix circular receptacle connector is a receptacle with a plurality of sockets.

7. The rechargeable power pack of claim 1, further comprising:
a battery adapter with a first end with a plurality of electrical contacts, the first end formed to mechanically and electrically detachably couple, in place of a battery, with the cordless power tool, and the battery adapter including a second end with a plurality of electrical contacts and the second end including a connector to mechanically and electrically detachably couple with the DC output electrical connector, the first end and the second end each electrically coupled to a flexible electrical cord with a plurality of electrical conductors for transferring power from the DC output electrical connector to the cordless power tool.

8. The rechargeable power pack of claim 1, further comprising:
a fan disposed in an opening in the protective carrying case to provide airflow between the interior of the protective carrying case and the exterior of the protective carrying case and the fan only operates when the AC input electrical connector is connected to an external electric AC power source.

9. The rechargeable power pack of claim 1, further comprising:
another DC output electrical connector for electrically connecting to the cordless power tool, the DC output electrical connector coupled in a parallel electrical configuration with the DC output electrical connector for electrically connecting with another a cordless power tool.

10. The rechargeable power pack of claim 1, further comprising:
at least one accessories outlet for providing power to an external accessory.

11. The rechargeable power pack of claim 10, wherein the at least one manually operable multipole switch electrically couples the at least one accessories outlet to one of the first battery element and the second battery element not electrically coupled to the DC output electrical connector.

12. The rechargeable power pack of claim 1, further comprising:
at least one charger card for controlling charging of each of the at least the first battery element and the second battery element.

13. The rechargeable power pack of claim 1, wherein the at least one manually operable multipole switch is a mechanical switch.

14. The rechargeable power pack of claim 1, wherein the at least one manually operable multipole switch is a solid state switch.

* * * * *

UNITED STATES PATENT AND TRADEMARK OFFICE
CERTIFICATE OF CORRECTION

PATENT NO. : 10,862,176 B2  
APPLICATION NO. : 16/009895  
DATED : December 8, 2020  
INVENTOR(S) : Rick Degelau et al.

Page 1 of 1

It is certified that error appears in the above-identified patent and that said Letters Patent is hereby corrected as shown below:

On the Title Page

Item [71], Applicant should be changed from Florida Power & Light Company to Inventus Holdings, LLC.

Item [73], Assignee should be changed from Florida Power & Light Company to Inventus Holdings, LLC.

Signed and Sealed this
Twenty-fifth Day of October, 2022

Katherine Kelly Vidal
*Director of the United States Patent and Trademark Office*